United States Patent [19]
Kurosaki et al.

[11] Patent Number: 6,104,462
[45] Date of Patent: Aug. 15, 2000

[54] LCD AND FABRICATION METHOD THEREOF HAVING A PEDESTAL AND OVERLYING ORGANIC FILM AT A PERIPHERY OF THE DISPLAY

[75] Inventors: Minako Kurosaki; Teruyuki Midorikawa, both of Fukaya, Japan

[73] Assignee: Kabushiki Kaisha Toshiba, Kawasaki, Japan

[21] Appl. No.: 09/161,949

[22] Filed: Sep. 29, 1998

[30] Foreign Application Priority Data

Sep. 30, 1997 [JP] Japan ................................. 9-267361

[51] Int. Cl.⁷ ...................... G02F 1/1333; G02F 1/1339
[52] U.S. Cl. .............................. 349/138; 349/153
[58] Field of Search ................... 349/138, 149, 349/152, 153, 155, 190

[56] References Cited

U.S. PATENT DOCUMENTS

| | | | |
|---|---|---|---|
| 5,066,109 | 11/1991 | Kuratate et al. | 349/138 |
| 5,187,604 | 2/1993 | Taniguchi et al. | 349/138 |
| 5,317,434 | 5/1994 | Ohara | 349/153 |
| 5,691,793 | 11/1997 | Watanabe et al. | 349/155 |

FOREIGN PATENT DOCUMENTS 6-82797  3/1994  Japan .

*Primary Examiner*—Walter Malinowski
*Attorney, Agent, or Firm*—Pillsbury Madison & Sutro LLP

[57] ABSTRACT

A liquid crystal displaying apparatus is disclosed, that comprises a pair of substrates, a liquid crystal material filled in the space between the pair of substrates, a plurality of lines formed on one of the pair of substrates, an organic film formed on the plurality of lines, a conductive film formed on the organic film, and a pedestal, wherein the plurality of lines extend from a first area to a second area, the organic film being disposed on the plurality of lines in the first area, the second area exceeding an edge portion of the organic film, wherein the pedestal is disposed between the first area and the second area through the edge portion, wherein the organic film is formed between the pedestal to a non-pedestal area, wherein the thickness in the vicinity of at least the edge portion of the organic film formed on the pedestal is smaller than the thickness of the organic film formed in the non-pedestal area, and wherein the thickness of the pedestal is smaller than the thickness of the organic film formed in the non-pedestal area.

16 Claims, 4 Drawing Sheets

LCD AND FABRICATION METHOD THEREOF HAVING A PEDESTAL AND OVERLYING ORGANIC FILM AT A PERIPHERY OF THE DISPLAY

BACKGROUND OF THE INVENTION

1. Field of the Invention

The present invention relates to a liquid crystal displaying apparatus and a fabrication method thereof.

2. Description of the Related Art

In recent years, to accomplish a high speed picture process and a high quality display picture of a liquid crystal displaying apparatus, an active matrix drive type color liquid crystal displaying apparatus has been widely used. In this color liquid crystal displaying apparatus, switching thin film transistors are disposed for individual display pixels.

Generally, in a liquid crystal displaying apparatus, two glass substrates having electrodes are sealed with an adhesive agent and a sealing agent. Liquid crystal material is filled in the space between the two glass substrates. To keep the distance between the two substrates constant, plastic beads, or the like, with equal particle diameters are dispersed as spacers between the substrates. In a color liquid crystal displaying apparatus, a color filter layer having a color layer equivalent to three primary colors (RGB) is disposed on one of the two glass substrates.

In the active matrix drive type color liquid crystal displaying apparatus, as shown in FIG. 6, a thin film transistor (TFT) 47 composed of amorphous silicon (a-Si) as a switching device is disposed on one glass substrate 46 corresponding to each of a plurality of pixel electrodes 48 arranged in a matrix shape. The thin film transistor 47 has a gate electrode, a drain electrode, and a source electrode. The gate electrode is connected to a scanning line. The drain electrode is connected to a signal line. The source electrode is connected to a pixel electrode 48. In such a manner, an array substrate is structured. On the array substrate, a protection film and an alignment film 49 are successively disposed. The alignment film 49 aligns the orientation of liquid crystal molecules.

The other substrate is an opposite substrate that is conventionally composed of a transparent glass substrate 41, a light shielding layer (black matrix) 42, a three-primary-color filter 43, a color filter protection film, a common transparent electrode 44, and an upper alignment film 45. The light shielding layer 42 is disposed on the transparent glass substrate 41. The light shielding layer 42 is composed of for example a Cr metal film.

The pair of substrates are oppositely disposed with a spacer 51 so that they are spaced with a predetermined distance. The substrates are adhered with seal agent applied on the periphery thereof.

The TFT 47 is disposed opposite to the light shielding layer 42. The color filter 43 is disposed opposite to the pixel electrode 48.

The liquid crystal material 50 is filled in the space between the array substrate and the opposite substrate. Polarizing plates are disposed on both sides of the array substrate and the opposite substrate. The liquid crystal material is used as an optical shutter so that a color picture is displayed.

In recent years, high luminance and low power consumption have been strongly desired for an activate matrix drive type liquid crystal displaying apparatus. Thus, the improvement of the aperture ratio of each pixel has been required.

The aperture ratio depends on the black matrix 42 that insulates light from an area free of optical modulation between advancent pixel electrodes. The aperture portion of the black matrix 42 is formed corresponding to the shape of the pixel electrode.

As described above, the light shielding layer (black matrix) 42 is formed on the opposite substrate side as with the color filter 43. However, due to the displacement between the array substrate and the opposite substrate and the difference between the pattern pitch on the array substrate and the pattern pitch of the light shielding layer (black matrix) 42 on the opposite substrate, the size of the opening portion of the light shielding layer (black matrix) 42 should be smaller than the size of the pixel electrode 48.

Thus, the aperture ratio of each pixel deteriorates.

To improve the aperture ratio of pixels, a method of which a black matrix 42 is formed on an array substrate has been proposed. Alternatively, a method of which a pixel electrode 48 of an array substrate is extended to a scanning line and a signal line that surround the pixel electrode 48 has also been proposed. In this method, the scanning line and the signal line are used as a black matrix 42.

In addition to an area between each pixel electrode 48, an outer peripheral area of the panel (outside a display area) should be light-shielded with a light shield layer. In this example, the light shielding layer outside the display area is referred to as a peripheral light shielding layer.

When a light shielding layer is formed on an array substrate, the resistivity should be sufficiently high. Thus, a resin is used as light shield layer material. Because the light shielding ratio of a resin is lower than that of a light shielding material composed of metal, the thickness of light shielding layer composed of a resin should be increased. However, when the thickness of the light shielding layer is increased, the following problem occurs.

Generally, a pixel electrode is patterned with a conductive film formed on the entire surface of the array substrate by the photo process. At this point, a photoresist for patterning the pixel electrode remains in a stage portion on the periphery of the light shielding layer. When the pattern is developed, the photoresist cannot be satisfactorily removed. Thus, the conductive film remains in the stage portion on the periphery of the black matrix.

In particular, when the conductive film remains in the stage portion on the periphery of the light shielding layer, lines in the vicinity of the light shielding layer short-circuit. Thus, display defects, and consequently, product defects, occur.

SUMMARY OF THE INVENTION

The present invention overcomes the limitations indicated above by providing a liquid crystal displaying apparatus having a peripheral light shielding layer that satisfactorily shields light. In additions, the present invention prevents a conductive film for a pixel electrode from remaining in a stage portion on the periphery of the light shielding layer so as to display a high quality picture with a high cost performance. Moreover the present invention provides a fabrication method of such a liquid crystal displaying apparatus.

A first aspect of the present invention is a liquid crystal displaying apparatus, comprising a pair of substrates, a liquid crystal material filled in the space between the pair of substrates, a plurality of lines formed on one of the pair of substrates, an organic film formed on the plurality of lines, a conductive film formed on the organic film, and a pedestal.

The plurality of lines extend from a first area to a second area, the organic film being disposed on the plurality of lines in the first area, and the second area exceeding an edge portion of the organic film. The pedestal is disposed between the first area and the second area through the edge portion, wherein the organic film is formed between the pedestal to a non-pedestal area. The thickness in the vicinity of at least the edge portion of the organic film formed on the pedestal is smaller than the thickness of the organic film formed in the non-pedestal area, and the thickness of the pedestal is smaller than the thickness of the organic film formed in the non-pedestal area.

The organic film is a light shielding film formed on at least a part of the periphery of a display area. The organic film is formed in a shape that surrounds the periphery of the display area. The plurality of lines extend from the display area to the outside of the display area.

A switching device is disposed on one of the pair of substrates, the switching device having a semiconductor layer, a gate, and a gate insulation film. The gate is disposed opposite to the semiconductor layer, the gate insulation film is disposed between the semiconductor layer and the gate. The pedestal is composed of the same material as the gate insulation film.

A switching device is disposed on one of the pair of substrates, the switching device having a semiconductor layer, a gate, and a gate insulation film. The gate is disposed opposite to the semiconductor layer, the gate insulation film is disposed between the semiconductor layer and the gate. A protection film is formed on the switching device so as to protect the switching device. The pedestal is composed of the same material as the protection film.

A switching device is disposed on one of the pair of substrates, the switching device having a semiconductor layer, a gate insulation film, a gate electrode, source and drain electrodes, and a first inter-layer film. The gate insulation film is formed on the semiconductor layer, the gate electrode is formed on the gate insulation film, the source and drain electrodes are connected to the semiconductor layer, and the first inter-layer film is formed between the source and drain electrodes and the gate electrode. The pedestal is composed of the same material as the first inter-layer film.

A switching device, a second inter-layer film, and a pixel electrode are formed on one of the plurality of substrates, the second inter-layer film being formed on the switching device, the pixel electrode being connected to the switching device through a contact hole formed in the second inter-layer film. The pedestal is composed of the same material as the second inter-layer film.

The second inter-layer film is colored.

The pair of substrates are adhered with a seal member in a closed curve shape. The pedestal is formed inside the closed curve including an area of the seal member.

A column-shaped spacer is formed between the pair of substrates so as to keep the distance therebetween. The column-shaped spacer is composed of the same material as the organic film. The column-shaped spacer is formed in an area of the seal member. The column-shaped spacer is formed in the area of the seal member and the area inside the closed curve. The pedestal is formed in the area of the seal member. The column-shaped spacer is formed on the pedestal.

A second aspect of the present invention is a liquid crystal displaying apparatus, comprising a pair of substrates, a liquid crystal material filled in the space between the pair of substrates, a plurality of lines formed on one of the pair of substrates, an organic film formed on the plurality of lines, a conductive film formed on the organic film, and a pedestal. The plurality of lines extend from a first area to a second area, the organic film being disposed on the plurality of lines in the first area, and the second area exceeding an edge portion of the organic film. The thickness of at least an edge portion of the organic film is smaller than the thickness of the other portion of the organic film.

The organic film is formed in a tapered shape in the vicinity of an edge portion of the organic film.

In the liquid crystal displaying apparatus according to the present invention, lines are formed on the front surface of one of a pair of substrates. An organic film is formed on the lines. A conductive film is formed on the organic film. An edge portion of the organic film is formed on a pedestal. The organic film functions as a light shielding film. The peripheral portion of the light shielding layer is formed on the pedestal. With the pedestal, when the conductive film is patterned as a pixel electrode film or the like, a patterning photoresist does not almost remain. Thus, the pixel electrode film can be satisfactorily prevented from remaining in the peripheral portion. Consequently, the pixel electrode film can be prevented from short-circuiting with the lines formed on the substrate. As a result, a product defect can be almost prevented. In addition, the light shielding film securely prevents light from leaking out.

In the liquid crystal displaying apparatus of the second aspect of the present invention, because the thickness of the edge portion of the organic film as the light shielding film is smaller than the thickness of the other portion of the organic film, the same effect as the liquid crystal displaying apparatus of the first aspect can be obtained.

Thus, the liquid crystal displaying apparatus according to the present invention can display a high quality picture.

A third aspect of the present invention is a fabrication method of a liquid crystal displaying apparatus, comprising forming a plurality of lines from a display area to a non-display area of a first substrate of a pair of substrates, forming an insulation layer on the lines in the display area and forming a pedestal in the non-display area so that the pedestal is disposed at a part of the area of the lines. The method also includes an organic film on the pedestal in a shape having the edge portion of the organic film and a non-pedestal area, forming a conductor film on the front surface of the first substrate, forming a desired pattern on the conductor film and removing at least a portion that contacts the pedestal, adhering the first substrate and the other substrate as the second substrate, and filling a liquid crystal material in a space formed between the first substrate and the second substrate.

The insulation layer is a color layer.

The fabrication method further comprises the step of forming a column-shaped spacer for keeping the distance between the first substrate and the second substrate, wherein the column-shaped spacer forming step is the same as the organic film forming step.

In the fabrication method of a liquid crystal displaying apparatus according to the present invention, because the periphery of an organic film is formed on a pedestal, a photoresist for patterning a conductive film can be prevented from remaining on the pedestal. Thus, a light shielding layer composed of the organic film can securely prevent light form leaking out. Consequently, lines in a non-display area on the substrate can be prevented from short-circuiting with the conductive film on the organic film. As a result, a product defect can be almost prevented.

Thus, in the fabrication method of the present invention, a liquid crystal displaying apparatus that displays a high quality picture can be obtained with a high cost performance.

As long as the pixel electrode film hardly remains in the peripheral portion of the organic film, the sectional shape of the pedestal formed on the periphery of the organic film that functions as a light shielding layer may be trapezoid, angular, semi-circular, or stage shape having a plurality of stage portions. The height from the surface of the substrate having the lines of the pedestal is smaller than the thickness of at least the organic film.

The pedestal may be disposed in the line portion on the periphery of the substrate or on the entire periphery of the substrate.

The pedestal may be formed as an independent fabrication step. Alternatively, the pedestal may be formed in common with another fabrication step so as to simplify the fabrication steps.

For example, in an active matrix type liquid crystal displaying apparatus, a switching device is disposed on one of the pair of substrates corresponding to each of a plurality of pixel electrodes. As an example of the switching device, an inversely staggered type TFT, or a coplanar type TFT is known.

In the case of the inversely staggered type TFT, the pedestal is formed in the same fabrication step as the gate insulation film with the same material thereof. Alternatively, the pedestal may be formed in the same fabrication step as a protection film with the same material thereof.

In the case of the coplanar type TFT, the pedestal can be formed in the same fabrication step as an inter-layer insulation film with the same material thereof.

Thus, the fabrication step of the pedestal can be simplified.

To obtain a sufficient light shielding ratio, the thickness (distance from the substrate) of the light shielding layer should be increased. In this case, when a color filter, an array pattern, and the like that are thinner than the light shielding layer overlap with the area of the pedestal on the light shielding layer, a plurality of stages are formed. Thus, the stage difference of each stage portion becomes small. The resist for patterning the pixel electrode film hardly remains in each stage portion. Thus, the pixel electrode film is not formed on the periphery of the pedestal. Even if a wiring pattern is present in the vicinity of the light shielding layer, the wiring pattern can be almost prevented from short-circuiting.

When the stage difference of each stage portion on the light shielding layer gradually becomes small, the pattern of the light shielding layer is preferably forwardly tapered. As an example of the method for forwardly tapering the pattern of the light shielding layer, a material with low Tg (glass transition point) may be used for the light shielding layer. As another example, the base on which the edge portion of light shielding layer is disposed is surface-treated so as to improve the wetting property. Alternatively, en edge portion of the light shielding layer may be formed by gradual exposing method.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, with reference to the accompanying drawings, embodiments of the present invention will be described in detail.

First Embodiment

Figure 1:
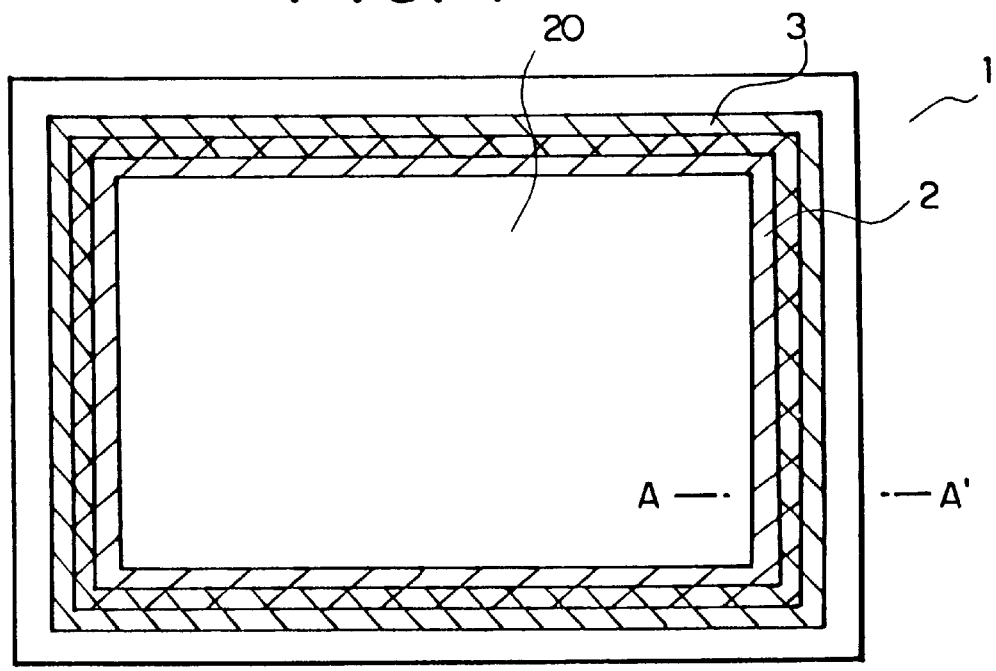
FIG. 1 is a plan view showing the structure of a liquid crystal displaying apparatus according to the present invention.

FIG. 1 is a plan view showing a switching device array substrate 1 in a liquid crystal displaying apparatus viewed from an opposite substrate 1'. In FIG. 1, for simplicity, a display area 20 in a cell is omitted. As is known, a plurality of switching devices are disposed in a matrix shape on a glass substrate of a switching device array substrate 1 of the liquid crystal displaying apparatus. Each of the switching devices has a drain electrode, a source electrode, and a gate electrode. The drain electrode is connected to a signal line. The source electrode is connected to a pixel electrode. The gate electrode is connected to a scanning line. A plurality of lines 10 of these signal lines and scanning lines extend to the outside of the display area 20 through a seal portion surrounded by the seal member 3. The lines 10 are connected to a signal line driving circuit, a scanning line driving circuit, and so forth disposed outside the substrate 1 or in the vicinity thereof.

Figure 2:
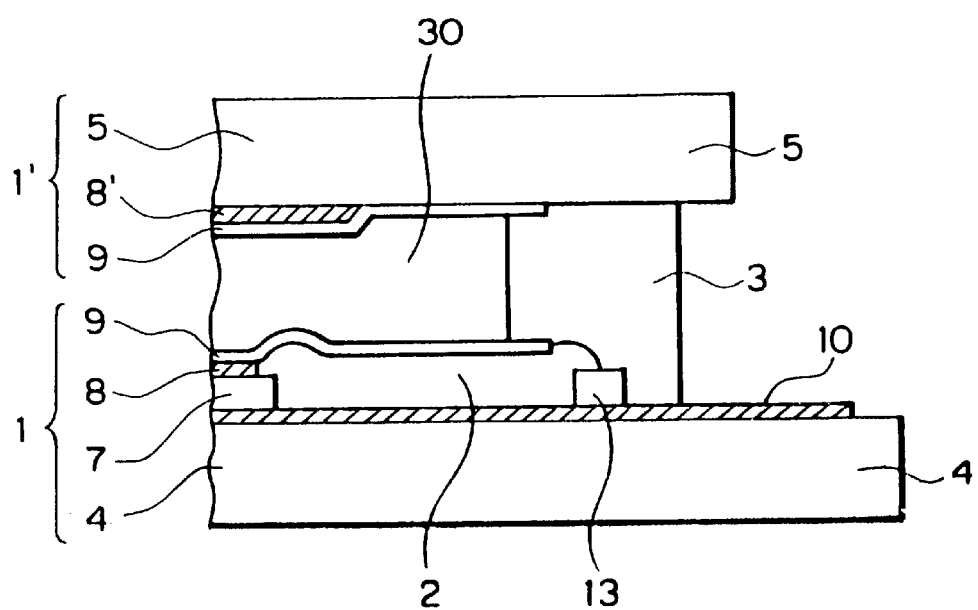
FIG. 2 is a sectional view showing the structure of a sealing portion of a liquid crystal displaying apparatus according to a first embodiment of the present invention.

FIG. 2 is a sectional view taken along line A–A' (including line portions) of the liquid crystal displaying apparatus composed of a switching device array substrate 1 (shown in FIG. 1) and an opposite substrate 1'.

In FIG. 2, reference numeral 3 is a seal member. Reference numeral 13 is a pedestal disposed in the seal portion. Reference numeral 2 is an organic film that functions as a light shielding film. Reference numeral 7 is a color filter. Reference numeral 8 is a pixel electrode. Reference numeral 9 is an alignment film. Reference numeral 10 is a line such as a signal line or a scanning line disposed on the substrate. These structural members are disposed on the transparent glass substrate 4.

On the other hand, the opposite substrate 1' comprises a glass substrate 5, a common electrode 8', and an alignment film 9. The common electrode 8' is disposed on the glass substrate 5. The alignment film 9 is disposed on the common electrode 8'.

Figure 3:
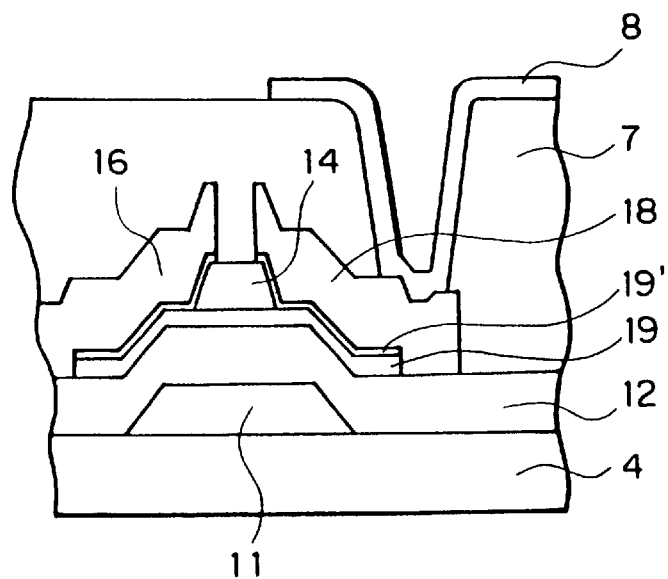
FIG. 3 is a sectional view showing the structure of a thin film transistor portion of the liquid crystal displaying apparatus according to the first embodiment of the present invention.

FIG. 3 is an enlarged sectional view showing a thin film transistor portion of the liquid crystal displaying apparatus. In FIG. 3, reference numeral 4 is a glass substrate. Reference numeral 11 is a gate electrode. Reference numeral 12 is a gate insulation film. Reference numeral 19 is a semiconductor layer. Reference numeral 19' is an ohmic contact layer. Reference numeral 14 is a channel protection film. Reference numeral 16 is a drain electrode. Reference numeral 18 is a source electrode. Reference numeral 7 is a color filter layer. Reference numeral 8 is a pixel electrode.

As is clear from FIGS. 2 and 3, according to the embodiment, the color filter is disposed on the array substrate. A pedestal 13 is disposed at an edge portion of the organic film 2. The organic film 3 is disposed from a non-pedestal portion to nearly the center of the pedestal. The height of the pedestal 13 to the substrate is smaller than the thickness of the organic film 2 in the non-pedestal portion. In addition, the thickness of the organic film 2 on the pedestal 13 is smaller than the thickness of the organic film in the non-pedestal portion.

Figure 7:
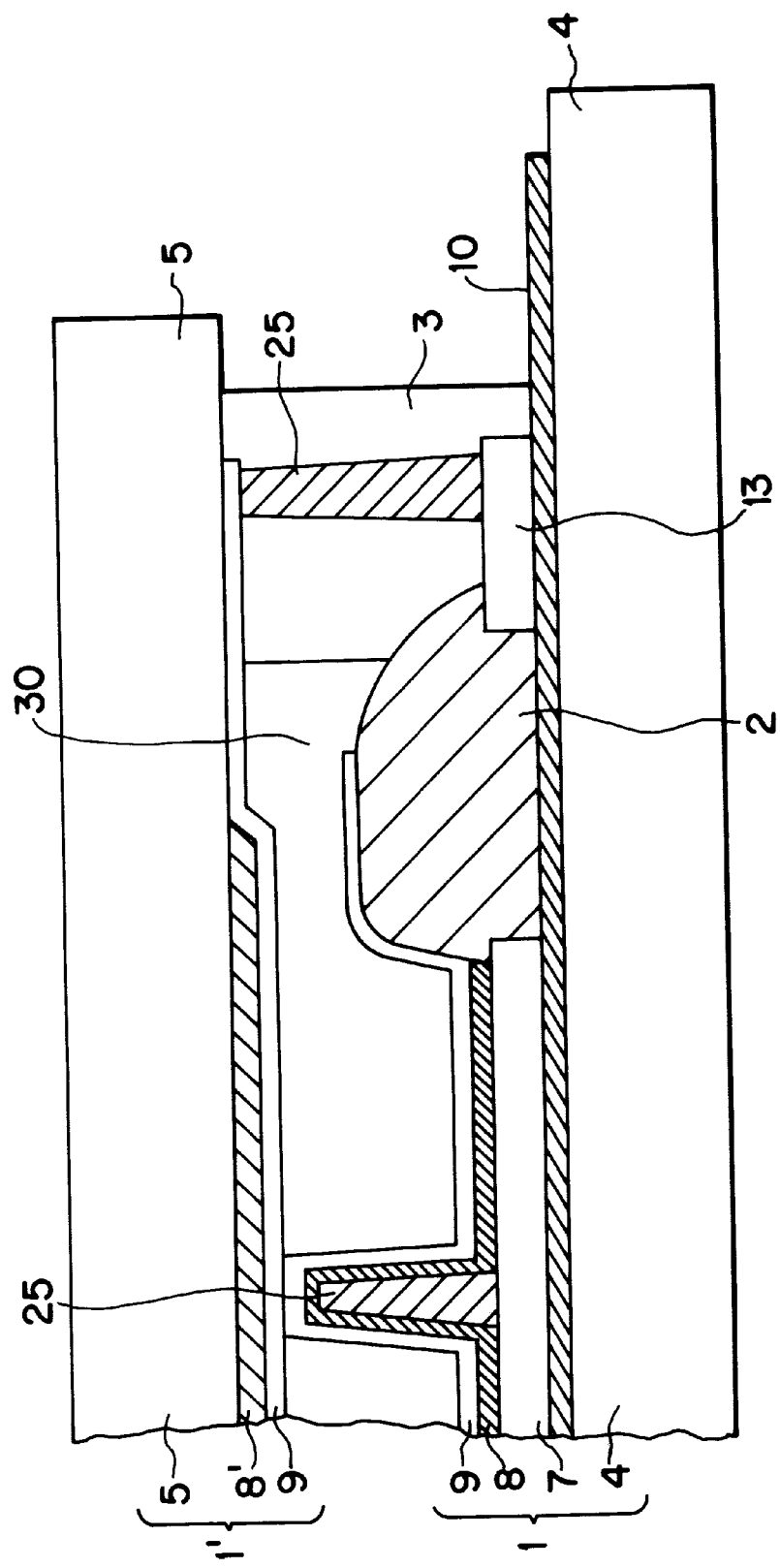
FIG. 7 is a sectional view showing a portion of a liquid crystal displaying apparatus including a column-shaped spacer according to an embodiment of the present invention.

Next, with reference to FIGS. 2, 3 and 7, fabrication steps of the liquid crystal display apparatus will be described.

A metal such as molybdenum-tangusten was formed for around 0.3 µm on a glass substrate 4 by sputtering method. A pattern was formed in a predetermined shape by photolithography method. Thus, a scanning line and a gate electrode 11 were formed. A gate insulation film 12 composed of silicon dioxide or silicon nitride was formed for 0.15 µm on the pattern. Thereafter, a semiconductor layer 19 and a channel protection film 14 were formed. Next, a signal line, a drain electrode 16, and a source electrode 18 composed of Al were formed for 0.3 µm. Thus, a TFT was obtained.

On the other hand, nega-resists containing pigments of red (R), green (G), and blue (B) were patterned by photolithography method. Thus, a color filter layer 7 having R, G, and B color filters was formed, at the same time, a pedestal 13 was formed. Thereafter, black nega-resists containing pigments of R, G, and B were patterned by photolithography method. Thus, as indicated in FIG. 7, a columnshaped spacer 25 and an organic film 2 were formed. At that point, the organic film 2 was formed so that it covered to the center of the pedestal 13.

Next, a conductor layer composed of ITO was formed for 0.1 µm by spattering method. After a resist was coated, a pixel electrode 8 was patterned by etching method. The source electrode 18 was connected to the pixel electrode 8 above the color filter layer 7 through a contact hole of the color filter layer 7.

Next, an alignment film 9 composed of polyimide was formed on the pixel electrode 8 and the organic film 2. Thus, a substrate having the color filter layer 7 and the switching device was obtained.

Thereafter, a common electrode 8' composed of ITO was formed for 0.15 µm on the glass substrate 5 disposed opposite to the glass substrate 4. An alignment film 9 composed of polyimide was formed on the common electrode 8'. Last, the array substrate 1 and the opposite substrate 1' were adhered through the sealing agent, to form a seal number 3 and a liquid crystal material 30 was filled in the space between the array substrate 1 and the opposite substrate 1'. The spacers 25 may be formed in the seal member 3, and also on the pedestal. Thus, a liquid crystal displaying apparatus was obtained.

The spacer 25 can be formed in the seal member 3. Alternatively, the spacer 25 can be formed on the pedestal 13.

Experimental results of the liquid crystal displaying apparatus fabricated in the above-described method show that the pixel electrode film is almost prevented from remaining in the edge portion of the organic film 2. Thus, the short-circuit of lines due to the remaining film was suppressed. Consequently, the operational defect of the apparatus was almost prevented. In addition, since the organic film had a sufficient thickness, a high quality picture could be obtained. Thus, liquid crystal displaying apparatus could be obtained with a high yield.

Figure 5:
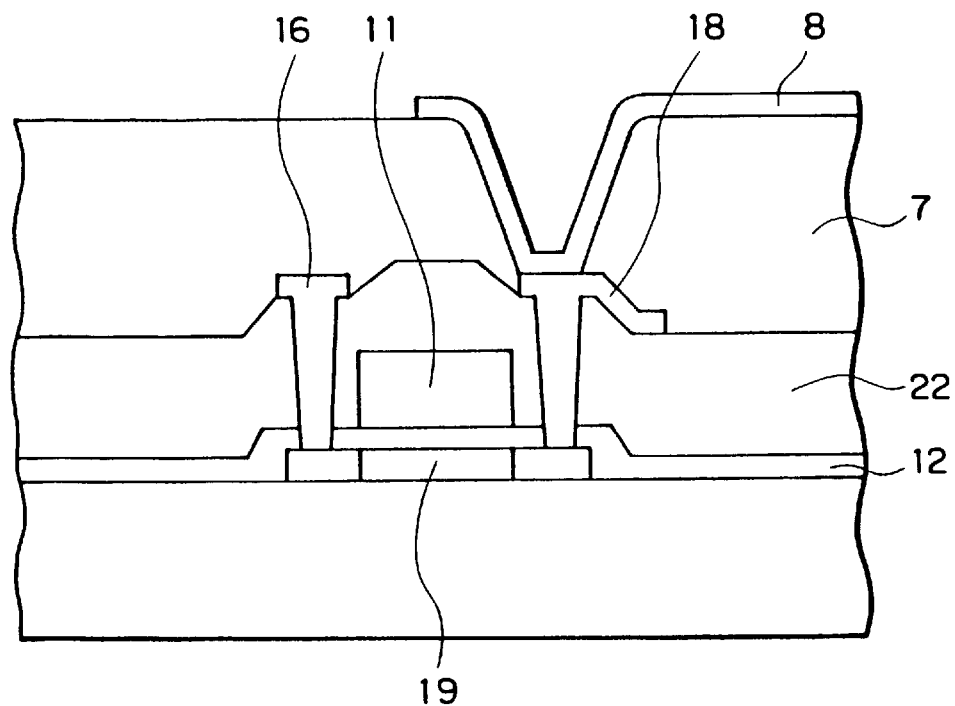
FIG. 5 is a sectional view showing the structure of another thin film transistor according to the present invention.
Figure 6:
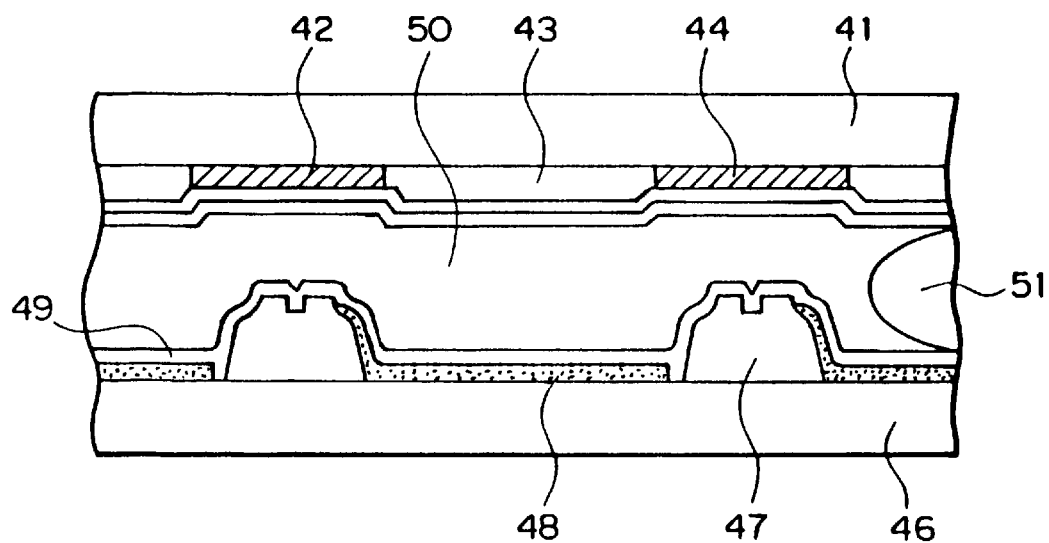
FIG. 6 is a sectional view showing an example of the structure of a conventional liquid crystal displaying apparatus.

FIG. 5 is a sectional view showing an example of the structure of a coplanar type thin film transistor. In FIG. 5, reference numeral 4 is a glass substrate. Reference numeral 19 is a poly-silicon film. Reference numeral 12 is a gate insulation film. Reference numeral 11 is a gate electrode. Reference numeral 16 is a drain electrode. Reference numeral 18 is a source electrode. Reference numeral 22 is an inter-layer insulation film. Reference numeral 7 is a color filter. On the color filter layer 7, a pixel electrode 8 is formed.

According to the first embodiment, when the thin film transistor with the structure shown in FIG. 5 is used, the pedestal 13 can be formed in the same fabrication step as not only the color filter 7, but also the inter-layer insulation film 22, the gate insulation layer 12, a passivation film formed on the thin transistor (not shown) or the like, with the same material thereof.

The color layer may be formed by dyeing method, printing method, or electrodeposition method instead of the photolithography method of the pigment resists. As the pedestal 13, color filters can be used, by superposing stepwise two or more color filters.

Second Embodiment

Next, a liquid crystal displaying apparatus according to a second embodiment of the present invention will be described.

Figure 4:
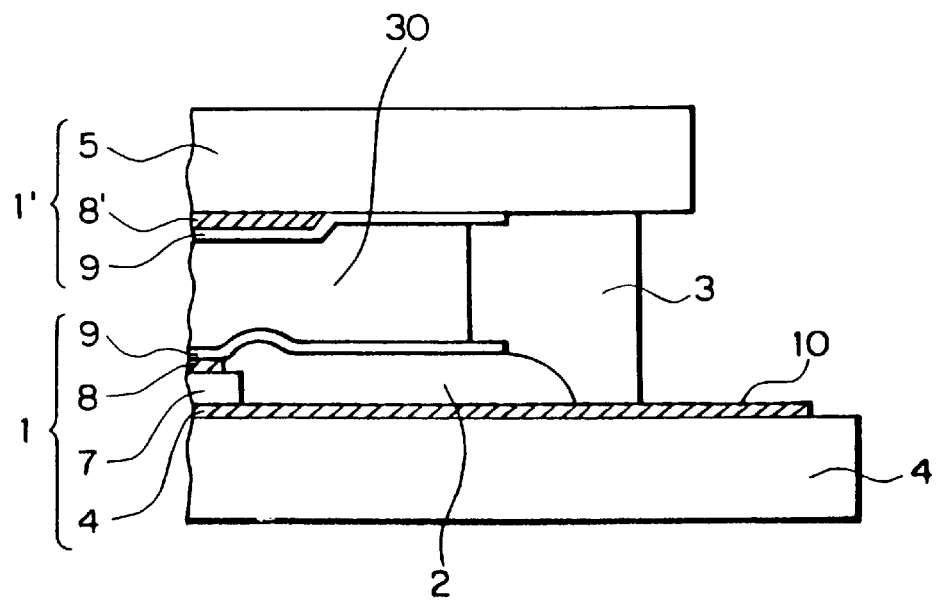
FIG. 4 is a sectional view showing the structure of a sealing portion of a liquid crystal displaying apparatus according to a second embodiment of the present invention.

FIG. 4 is a sectional view showing the structure of the liquid crystal displaying apparatus according to the second embodiment of the present invention.

As shown in FIG. 4, according to the second embodiment, a pedestal is not formed on a seal portion. An edge portion of an organic film 2 is tapered in the direction of the outer peripheral portion of the substrate. Other structures thereof are the same as those of first embodiment.

Experimental results of the liquid crystal displaying apparatus fabricated in the above-described method show that the pixel electrode film does not almost remain on the periphery of the organic film 2 and short-circuit of lines due to the pixel electrode film that remained remarkably decreases. Consequently, the operational defect of the apparatus was almost prevented. Thus, liquid crystal displaying apparatus could be obtained with a high yield.

As described above, in the liquid crystal displaying apparatus according to the present invention, a photoresist for patterning a pixel electrode film does not remain in an edge portion of a light shielding layer. Thus, the pixel electrode film or the like can be almost prevented from being formed in the edge portion of the light shielding layer. When a wiring pattern is present in the vicinity of the light shielding layer, short-circuit can be prevented. Thus, a product defect can be prevented. In addition, since the light shielding layer can be thickly disposed, the sufficient light shielding can be realized. Consequently, a liquid crystal displaying apparatus that displays a high picture quality with a high cost performance can be provided.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A liquid crystal displaying apparatus, comprising:
   a first substrate;
   a plurality of scanning lines and signal lines on said first substrate in a matrix fashion;
   a plurality of switching devices each disposed in the vicinity of an intersection of said scanning lies and said signal lines;
   a plurality of pixel electrodes, connected to said switching devices, in a display area;
   an organic film formed at a periphery of said display area;
   a pedestal on said first substrate and underneath an edge portion of said organic film;
   a second substrate opposed to said first substrate; and
   a liquid crystal material filled in a space between said first substrate and said second substrate,
   wherein the thickness of said organic film on said pedestal is thinner than the thickness of said organic film on a non-pedestal area, and
   wherein the thickness of said pedestal is thinner than the thickness of said organic film on said non-pedestal area.

2. The liquid crystal displaying apparatus as set forth in claim 1, wherein said organic film is a light shielding film.

3. The liquid crystal displaying apparatus as set forth in claim 1, wherein said plurality of lines extend from said display area to an outside of said display area.

4. The liquid crystal displaying apparatus as set forth in claim 1, wherein said switching device has a semiconductor layer, a gate electrode, and a gate insulation film disposed between said semiconductor layer and said gate electrode, wherein said pedestal is composed of the same material as said gate insulation film.

5. The liquid crystal displaying apparatus as set forth in claim 1, further comprising a protection film formed on said switching devices so as to protect said switching device, wherein said pedestal is composed of the same material as said protection film.

6. The liquid crystal displaying apparatus as set forth in claim 1, further comprising a first inter-layer film disposed between said scanning lines and said signal lines, wherein said pedestal is composed of the same material as said first inter-layer film.

7. The liquid crystal displaying apparatus as set forth in claim 1, further comprising a second inter-layer film disposed between said switching device and said pixel electrode, wherein said pixel electrode is connected to said switching device and said pixel electrode, and wherein said pedestal is composed of the same material as said second inter-layer film.

8. The liquid crystal displaying apparatus as set forth in claim 7, wherein said second inter-layer film is colored.

9. The liquid crystal displaying apparatus as set forth in claim 1, wherein said first substrate and said second substrate are adhered with a sealing member in a shape of a closed curve, and wherein said pedestal is located inside said closed curve including an area of said seal member.

10. The liquid crystal displaying apparatus as set forth in claim 9, further comprising a column-shaped spacer formed between said first substrate and said second substrate so as to keep a distance therebetween, wherein said column-shaped spacer is composed of the same material as said organic film.

11. The liquid crystal displaying apparatus as set forth in claim 10, wherein said column-shaped spacer is formed in an area of said seal member.

12. The liquid crystal displaying apparatus as set forth in claim 10, wherein said column-shaped spacer is formed in an area of said seal member and said display area.

13. The liquid crystal displaying apparatus as set forth in claim 10, wherein said pedestal is formed in an area of said seal member, and said column-shaped spacer is formed on said pedestal.

14. A fabrication method of a liquid crystal displaying apparatus, comprising:
    forming a plurality of scanning lines, signal lines, and switching devices at a display area of a first substrate;
    forming an insulation layer at said display area and an outside of said display area;
    forming a pedestal at said outside of said display area by patterning said insulation layer;
    forming an organic film over said first substrate with said pedestal;
    forming a surrounding pattern at a periphery of said display area by patterning said organic film;
    adhering said first substrate and a second substrate; and
    filling a liquid crystal material in a space between said first substrate and said second substrate,
    wherein said surrounding pattern has an edge portion located on said pedestal.

15. The fabrication method as set forth in claim 14, wherein said insulation layer is a colored layer.

16. The fabrication method as set forth in claim 14, further comprising forming a column-shaped spacer for keeping the space between said first substrate and said second substrate, wherein said column-shaped spacer forming is the same as said surrounding pattern forming.

* * * * *